United States Patent
Li

(10) Patent No.: US 9,701,543 B2
(45) Date of Patent: Jul. 11, 2017

(54) METHOD AND APPARATUS ON HALTING GLOBAL WARMING

(76) Inventor: Hsiao-Yuan Li, Richardson, TX (US)

( * ) Notice: Subject to any disclaimer, the term of this patent is extended or adjusted under 35 U.S.C. 154(b) by 0 days.

(21) Appl. No.: 13/135,534

(22) Filed: Jul. 8, 2011

(65) Prior Publication Data

US 2013/0011322 A1   Jan. 10, 2013

(51) Int. Cl.
 *C01D 7/12* (2006.01)
 *F04B 19/24* (2006.01)
 *C01D 7/18* (2006.01)
 *F04B 17/00* (2006.01)

(52) U.S. Cl.
 CPC .............. *C01D 7/123* (2013.01); *C01D 7/18* (2013.01); *F04B 17/006* (2013.01); *F04B 19/24* (2013.01)

(58) Field of Classification Search
 None
 See application file for complete search history.

(56) References Cited

U.S. PATENT DOCUMENTS

| | | | | |
|---|---|---|---|---|
| 5,275,794 A | * | 1/1994 | Luna | C01D 7/18 423/189 |
| 5,989,505 A | * | 11/1999 | Zolotoochin | C01D 7/10 423/206.2 |

FOREIGN PATENT DOCUMENTS

DE          4116300         * 5/1991

OTHER PUBLICATIONS

"Continuous process of sodium bicarbonate production by Solvay method". translated by Tomasz Pawlowski. Wydawnictwa, UW Warszawa (1996).*

* cited by examiner

*Primary Examiner* — Melvin C Mayes
*Assistant Examiner* — Sheng H Davis
(74) *Attorney, Agent, or Firm* — John Lindsay

(57) ABSTRACT

We have described herein a method and associated apparatus that can halt global warming with significant economic benefits. They include re-scrubbing half the carbon dioxide emitted from calcining baking soda into soda ash to produce twice as much soda ash and twice as much ammonium chloride as compared with the standard Solvay ammonia soda ash process, collecting from calcining exhaust a carbon dioxide and water mixture, transferring the carbon dioxide and water mixture to a hydraulic press for use as a multi component working medium.

1 Claim, 4 Drawing Sheets

Hydraulic Press 201

Accessories:
    Photovoltaic Solar Panel – 208
    Storage Battery -- 209

Enhanced Greenhouse Effect

Solar Distilled Water Producing Device

301A: Side View

301B: Cross Section View

301C: Overall Layout

Distiller     Evaporator     Distiller     Evaporator

Prior Art Solvay Process

△ -- baking soda and soda ash mixture

METHOD AND APPARATUS ON HALTING GLOBAL WARMING

FIELD OF INVENTION

The present invention relates to methods of carbon dioxide sequestration channeling into highly profitable products, and more specifically, by using recycling half the carbon dioxide re-emitted during the process of calcining baking soda into soda ash back into the carbon dioxide scrubbing tower to produce twice as much soda ash and ammonium chloride as comparing with the standard Solvay ammonia soda ash process for the purpose of quicken the capture of carbon dioxide supporting fast expansion of the industry before ocean level arises.

This application claims the privilege on petitioning to Make Special under the Green Technology Pilot Program currently available under USPTO.

BACKGROUND INFORMATION

Standard Solvay process of making soda ash was invented in the 1860s. The chemical reactions involved in the Solvay process are:

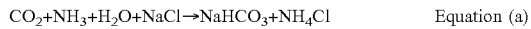

$$CO_2+NH_3+H_2O+NaCl \rightarrow NaHCO_3+NH_4Cl \quad \text{Equation (a)}$$

$$2NaHCO_3 \rightarrow Na_2CO_3+H_2O+CO_2 \quad \text{Equation (b)}$$

At that time ammonia was obtained from coal tar distillate in very small quantities, therefore the ammonium chloride in Equation (a) was worthwhile to be recycled by using lime (calcium hydroxide) from calcium oxide obtained from firing lime stone, and in the 1860s, anthropogenic carbon dioxide concentration in the atmosphere is far from causing global warming. That was the commercial background when Ernest Solvay built his first ammonia soda ash plant in Europe.

In the decade of year 2000, the anthropogenic carbon dioxide emission added annually to the atmosphere, as reported by the Energy Information Administration—Carbon Dioxide Information and Analysis Center, is 25 billion tons per year. It takes an area of rain forest the size of Great Britain to photosynthesis 1 (one) billion tons per year of carbon dioxide from the atmosphere. Since the earth does not possesses enough rain forest resources to remediate the global warming problem, it is therefore the intention of the present invention to provide a plan to bootstrap the carbon capture industry into a large scale, successful enterprise, with significant profit for internal expansion, to halt the trend of global warming.

UN COP 16 (16th Conference of Parties) held at Cancun, Mexico agreed to provide financial incentives from economic advance countries to encourage countries have rainforest area to keep these areas from destroyed. This is a welcoming action that COP 16 has taking. We hope other suggestions will be welcomed by future COP Conferences may pass into resolutions that will slowdown or even reverse global warming.

DESCRIPTION OF THE STATUS OF PRIOR ART ON CARBON DIOXIDE CAPTURING TECHNOLOGY

U.S. Department of Energy (DOE) has conducted technically successful carbon capture projects using amines as the capturing agent. Compared with the Solvay process, both methods can capture better than 98% of carbon dioxide emitted from flue gas. Being a high cost integrant, amine must be recycled for reuse. The added cost, measured in terms of COE (Cost of Electricity) increment, is currently near 40%. DOE publishes roadmap to reduce COE increment to 20%, and finally to 10% after certain years. For average American households, this increase in COE brings a financial burden that is difficult for them to accept. In addition, during the recycling process of amine, the captured $CO_2$ presented itself as highly concentrated carbon dioxide liquid. Additional cost will incur such as using the $CO_2$ liquid to enhance oil production on a depleted oil well clusters. The DOE branch ARPA-E has a project office IMPACCT oversees more than a dozen projects, mostly university researches, to address the COE reduction technologies.

STATEMENT OF THE INVENTION

The carbon dioxide emission from fossil fuel fired power plants can be used to produce soda ash and ammonium chloride via Solvay process, two products that have commercial value. Here are the approximate prices of these commodities:

Electricity—13 cents per kWh;
World soda ash price from Solvay process—20 cents per lb;
US soda ash price from mining—15 cents per lb;
Revenue estimation from selling soda ash to the open market per kWh of electricity:
With standard Solvay process new plants in the US—14 cents;
With total conversion Solvay process described in this invention—28 cents;
The COE increments are both negative by counting just selling only one product, the soda ash.

In this invention, the $CO_2$ produced in Equation (b) is recycled back into the lower deck of the scrubber towel. Therefore, all the $CO_2$ from the flue gas end up as soda ash. This is one major aspect of the improved Solvay process. Another major advantage of the improved Solvay process is that it ALSO produces twice as much $NH_4Cl$, which can be used as fertilizer in heavy rain fall regions to grow sugar cane, fermenting into ethanol used as gasoline additives.

The amount of sugar estimated in terms of weight ratio of sugar produced to $NH_4Cl$ fertilizer applied is in the range of several hundreds. In addition, the bagasse from sugar cane plantation is a usable bio-mass fuel for power generation, this time the weight ratio of bagasse produced to $NH_4Cl$ fertilizer applied is in the range of thousands. This is a very important feature of our technology useful in halting global warming. Since cane sugar and bagasse are both composed of base units of $C_{12}H_{22}O_{11}$. Each base unit, during photosynthesis absorbs 12 molecules of $CO_2$, measured in terms of amu (atomic mass unit) count of 528 per each base unit's amu count of 342, we can compute the total amount of carbon dioxide taken away from the atmosphere via photosynthesis by multiplying the factor (528/342) onto the amount of sucrose or bagasse produced, to obtain the weight of carbon dioxide captured. Add them together to obtain the total carbon dioxide captured from atmosphere.

In a special application case, the $CO_2+H_2O$ mixture from Equation (b) is not re-scrubbed but collected in a non-air containing kiln able to be used as a dual-component working fluid having no unique boiling point as a function of temperature. Using concentrated solar heating as a free source of energy to alternatively heat two $CO_2+H_2O$ reservoirs under electronic control, therefore raising the temperature and pressure of the $CO_2+H_2O$ mixture to power a hydraulic press used for water pumping or bagasse shipping. Small modification of the scrubbing system to collect pure form of $CO_2+H_2O$ can easily be done, namely the kiln to carry out Equation (b) can selectively turn on a vacuum pump to remove air inside the kiln while it is producing the dual component working fluid.

There exists certain important limitation that prevents us from successfully bootstrap the carbon capture industry in large scale: In a coal fired power plant, it normally burns 7 million tons of coal annually. Each ton of coal on average generates 1750 kWh of electricity. Such a coal fired power plant emits 25.7 million tons of carbon dioxide annually. It uses up 9.9 million tons of ammonia in a standard Solvay process each year, which is approximately 12% of worldwide ammonia production capacity, with purchase cost in billions of dollars. This reality forces us to think small for a demonstration project. Namely to work first with natural gas fired power plants since they emits only 1.31 lbs of carbon dioxide per kWh of power generated, compared with 4.61 lbs. $CO_2$ emission for coal fired power plant.

Assuming we identified a natural gas fired power plant that emits annually enough carbon dioxide to produce one million tons of soda ash by conventional Solvay process. Such a plant needs to purchase 321 thousand tons of ammonia, or 0.39% of the world's total ammonia capacity of around 82 million tons. This plant also produces 1,009,434 tons of $NH_4Cl$ annually useable as fertilizer for sugarcane plantation at heavy rain fall regions where chlorine ions are washed away without damaging the soil. Assume further the weight ratio of sugar to fertilizer be 100, as in our previous discussion, we can expect to harvest 32.1 million tons annually of sucrose. Each molecule of sucrose can be fermented into 6 fuel ethanol molecules. Assuming further the fermentation process has only a 70% yield factor, from 32.1 million tons of sucrose, 18.13 million tons of fuel ethanol can be produced. According to a report issued by International Sugar Organization published in 1Q 2011, after the summer of 2009, USA passed Brazil as the largest producer of Fuel Ethanol. In 2010, the United States produces 45 billion liters of fuel ethanol, Brazil, 30 billion liters, followed by EU at 10 billion liters as the number 3 producer. The current price for Brazil fuel ethanol is $90/bbl, compared with $72/bbl for US fuel ethanol. With this price, the 18.13 million tons of fuel ethanol produced by said demonstration project is worth approximately $25.1 billions. From our previous weight ratio of bagasse to fertilizer calculation, ten times of the weight of sucrose, or 321 million tons of bagasse is photosynthesized from $CO_2$ already in the atmosphere, now a useful biomass fuel for power generation without adding additional $CO_2$ into the atmosphere. The total $CO_2$ captured by bagasse is therefore estimated in the amount of 1,558,424,363 tons annually, within the error of estimation.

Remember we only need to absorb 25 billion tons of carbon dioxide already in the atmosphere to reach carbon neutral. 25,000,000,000/1,558,424,363=16. Only 16 such projects are needed to halt global warming, and consuming only 6.27% of world ammonia capacity, affordably purchased using fuel ethanol income. With improved total reflexive conversion of carbon dioxide into soda ash and ammonium chloride, only 8 project sites are needed to halt global warming, consuming the same amount of ammonia. This goal is certainly reachable before climate change becoming a disaster. Together it creates huge profit and large number of employment opportunities.

Now let us address the problem of finding an area the size of 25 Britain to install these sugar plantations. First of all, country such as Brazil, already during the last two decades, produced enough ethanol to support their E85 gasoline needs. Countries such as Vietnam, southern provinces of China, have continuous bidding advertisements to purchase ammonium chloride fertilizer. Cambodia, Haiti, Dominica Republic, Cuba, Mozambique, Congo, East Timor, Indonesia etc. are either doing small quantity sugar-ethanol production, or there exist economic incentive for them to do so in the near future. This may count as half of the 25 regions needed to absorb the carbon dioxide already in the atmosphere. The other half of the regions needs to be developed in coastal, hot weather regions such as Saudi Arabia, Kuwait, North Africa Countries over part of the Sahara desert, South West Africa, the Australia continent, India, Pakistan, etc. where peak sun ray can easily boiling seawater into distilled water, or high humidity water moisture, after condensing into distilled water, can be pumped by the hydraulic pump previously described to sugar plantation, an oasis in the desert. The salt crystal separated from seawater is usable in Solvay process.

Here for the process of making distilled water, this invention calls for a useful green-house-effect tube heater device consists of two concentric tubes made of steel for the outer tube, painted black, of stainless tube to minimize corrosion, also painted blank. The large diameter outside tube creates a green house enclosure containing very hot air. To prevent the hot air from escape, the tubes are sealed off by sections. The hot air heats a much smaller diameter inner tube with water flowing inside, pumped by the hydraulic press described previously. Furthermore, the temperature of the inner tube can be increased from the blackbody radiation temperature of the outer enclosure by installing aluminum trough reflective elements with focal line coincides with the inner tube.

Figure 4:
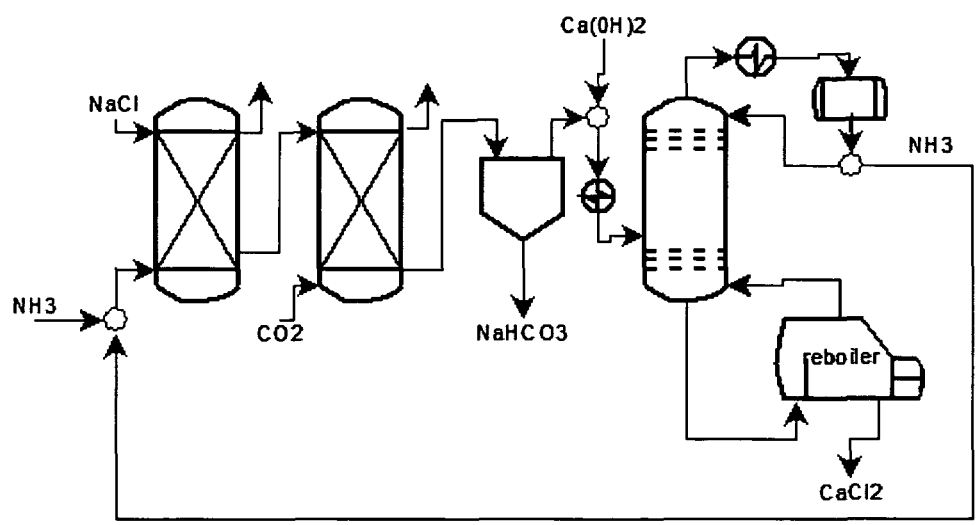
FIG. 4 shows the prior art kiln arrangement that carries out the reaction of Equation (b)
Figure 4:
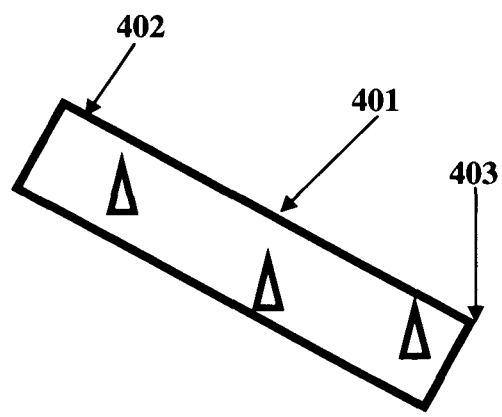

In the prior art practice as shown in FIG. 4, Equation (b) is carried out in a kiln 401 slightly tilted with an angle from upper, inlet end 402 toward lower, outlet end 403. It is well known from skilled operators in the art, if freshly centrifuged baking soda is fed into the inlet of the kiln, Equation (b) will be carried out in a very unsatisfactory manner that the newly formed soda ash at above 350 degree Centigrade will form a cake with wet baking soda in mixture of small percentage of soda ash, rendering the reaction of Equation (b) incomplete thus the product is not sellable.

To remediate this problem, small percentage of freshly centrifuged baking soda is mixed with large percentage of soda ash powder previously obtained from outlet 403, charged into inlet 402, then a sellable product of soda ash powders are thus obtained.

BEST EMBODIMENT OF THE INVENTION

Figure 1:
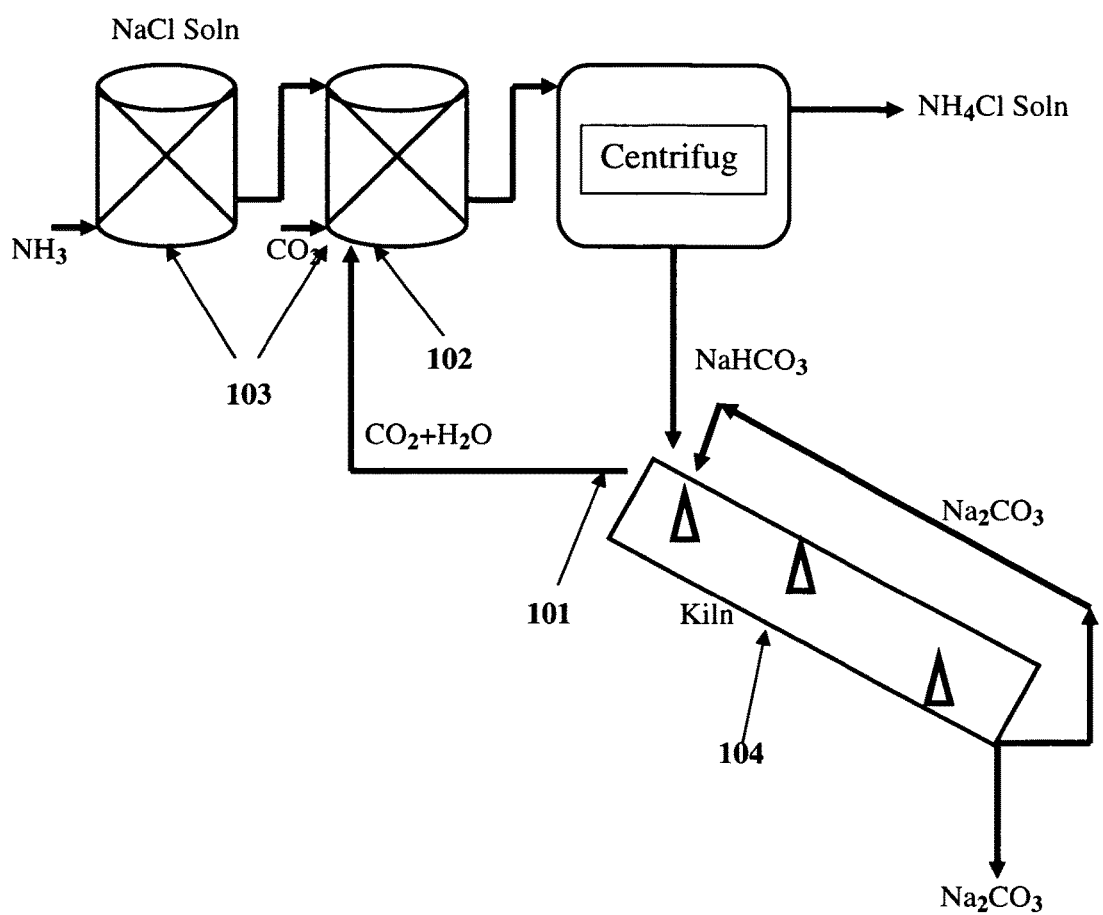
FIG. 1 shows the flow-diagram of total carbon dioxide capture scrubbing system.

In FIG. 1, the upper exhaust 101 of the calcining kiln containing one-half of the carbon dioxide captured by the conventional Solvay process is pumped into the bottom inlet 102 of the scrubbing tower 103, The baking soda, after separated from the centrifuge, is converted into soda ash as usual according to the prior art descriptions of FIG. 4.

For the purpose of collecting pure form of $CO_2+H_2O$ usable as bi-component working medium to power a hydraulic press unit used either as a pump or as a shipping vessel, the baking soda to soda ash conversion kiln 104 is equipped with a vacuum pump to remove air in the kiln 104 and the $CO_2+H_2O$ mixture so produced can be collected through a three way valve 105 whose outlet 105a is connected to the bottom inlet 102 of the scrubbing tower, and the other outlet 105b is connected to a $CO_2+H_2O$ storage tank 106 for future use as the working medium of said hydraulic press.

Figure 2:
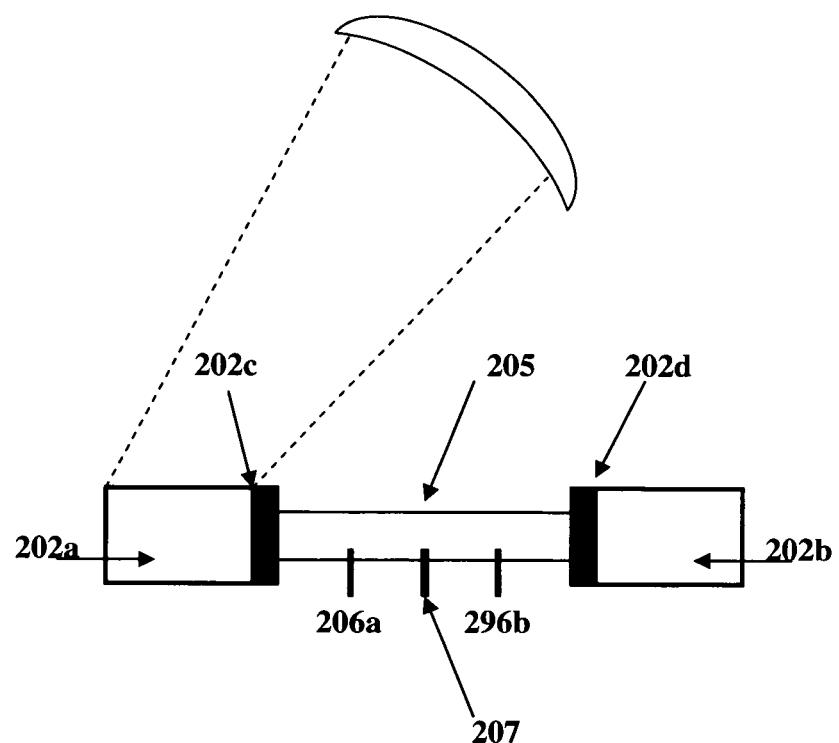
FIG. 2 shows the structure of solar powered hydraulic pump.

In FIG. 2, the hydraulic press 201 is consisting of two $CO_2+H_2O$ reservoirs 202a associated with moveable piston 202c, and reservoir 202b associated with moveable piston 202d, each reservoir is equipped with its own heat exchange unit 203a or 203b, obtaining its heat alternatively from the sunray condensing lens 204 pivoted through the lens' center of gravity axis to save power consumption of moving the lens 204. As the pressure at reservoir 202a increases, a rigid connecting rod 205 connecting pistons 202c and 202d pushes the lower pressure reservoir 202b into contraction. The connection rod 205 has two marker pins 206a and 206b mounted each at a fixed distance from the midpoint of the connection rod. A location sensor 207 at the midpoint location relative to the frame 208 of the hydraulic press 201 detected either the marker pin 206a or the marker pin 206b has made a contact with the location sensor 207, the electronics on board of hydraulic press 201 rotates the condensing plastic lens 204 from the heat exchange being heated to the heat exchange that was not heated. The process will go on continuously as long as the sunray is able to move the marker pin 206a or 206b passing through location sensor 207. The movement stops when the cloud covers the hydraulic press 201 until the cloud escapes, than the movement resumes. The hydraulic press 201 is equipped with enough photovoltaic solar panels 208 and storage battery 209 to support on board electronics, which also can locate the location of the sun as a function of the date and time of the on board electronic watch, and pointing the lens 204 accordingly.

Figure 3:
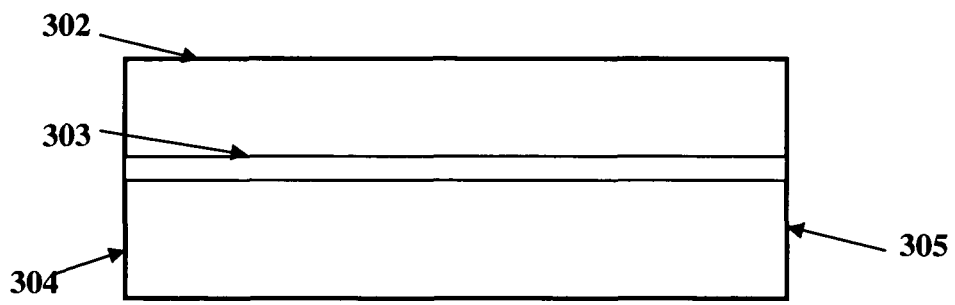
FIG. 3 shows the distilled-water producing tube heater device.
Figure 3:
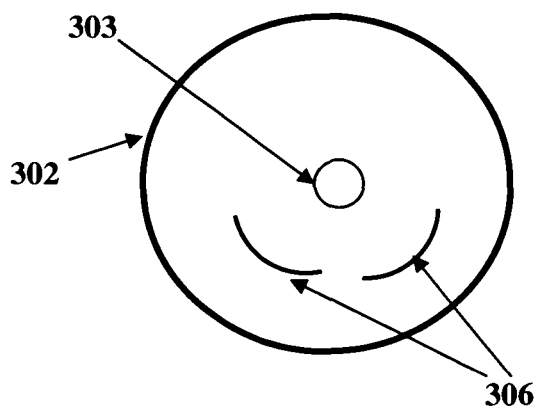
Figure 3:
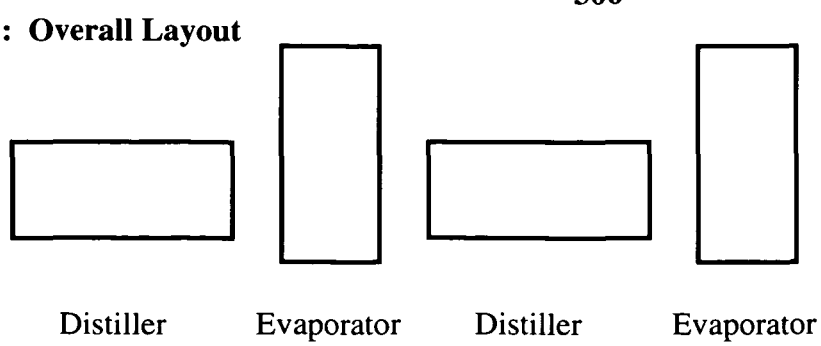

In FIG. 3, 301A shows the side view of a section of the distilled-water producing tube heater device. 301B shows the cross-sectional view of the distilled-water producing tube heater device. And 301C shows the overall layout of the water distiller.

In both 301A and 301B, 302 is the outer, large diameter steel tube, and 303 is the inner, smaller diameter stainless steel tube. Between the outer tube and the inner tube, segment partition plates 304 and 305 are welded solid-tie to form a closed enclosure avoiding the escaping leakage of hot air. In order to heat the inner tube to a temperature higher than the equilibrium temperature of a blackbody radiation enclosure, a multitude of reflective troughs 306 whole foci line are coincide with the inner tube, focusing the infrared radiation onto the inner tube.

The inner tubes from the segments are connected together in sequence to allow seawater passing through. After certain distance, the seawater inside the inner tube is feed into a separation tank wherein the steam and highly concentrated salt solution are separated, avoiding salt crystallizing inside the inner tube. The separated vapor is allowed to condense into distilled water inside a heat exchange using external evaporation cooling.

What is claimed is:

1. A method on carbon dioxide capturing able to halt global warming by enlarging regions suitable for sugarcane plantation as a substitute for rain forest to absorb large quantity of anthropogenic carbon dioxide already in the earth's atmosphere via photosynthesis, producing cane sugar, fermenting to fuel ethanol, and using the cellulose biogases, a bio-mass fuel for electricity generation without adding new carbon dioxide into atmosphere, comprising an improved Solvay process as depicted in FIG. 1, further comprising:
  A. a kiln to calcine baking soda into soda ash, the kiln equipped with a vacuum pump for removing air inside the kiln before calcining, and collecting from upper exhaust 101 a one-to-one molar ratio mixture of carbon dioxide and water for use as multi component working fluid; a scrubbing tower connected to said kiln and receiving said collected upper exhaust mixture of carbon dioxide and water;
  B. the scrubbing tower 103 equipped with a bottom inlet 102 for receipt of said one-to-one molar ratio of carbon dioxide and water to be scrubbed whereby twice as much of soda ash and twice as much of ammonium chloride is produced;
  C. providing a hydraulic press for receiving said mixture of carbon dioxide and water, and optionally transferring said mixture to said hydraulic press for use as a working medium.

* * * * *